(12) United States Patent
Ko et al.

(10) Patent No.: US 7,387,209 B2
(45) Date of Patent: Jun. 17, 2008

(54) PROTECTIVE APPARATUS FOR A PORTABLE DEVICE

(75) Inventors: Hui-An Ko, Guangdong (CN); Tzu-Cheng Yu, Guangdong (CN); Ding-Ding Zhang, Guangdong (CN); Xiao-Guang Li, Guangdong (CN); Kuan-Hong Hsieh, Guangdong (CN)

(73) Assignees: Hong Fu Jin Precision Industry (Shen Zhen) Co., Ltd., Longhua Town, Bao'an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/612,461

(22) Filed: Dec. 18, 2006

(65) Prior Publication Data

US 2008/0053851 A1 Mar. 6, 2008

(30) Foreign Application Priority Data

Sep. 1, 2006 (CN) .................. 2006 1 0062432

(51) Int. Cl.
*B65D 69/00* (2006.01)
(52) U.S. Cl. .................. 206/579; 206/37; 206/38
(58) Field of Classification Search ............ 206/305, 206/320, 38, 234, 579, 37, 39; 361/679, 361/680, 681
See application file for complete search history.

(56) References Cited

U.S. PATENT DOCUMENTS

| 4,075,702 A | * | 2/1978 | Davies | .................. 206/232 |
| 5,195,634 A | * | 3/1993 | Zaug | ..................... 206/320 |
| 5,607,054 A | * | 3/1997 | Hollingsworth | ............ 206/320 |
| 6,196,405 B1 | | 3/2001 | Kambouris | |
| 6,269,948 B1 | * | 8/2001 | Jackson | ..................... 206/320 |
| 2006/0226040 A1 | * | 10/2006 | Medina | ..................... 206/320 |

* cited by examiner

*Primary Examiner*—Luan K Bui
(74) *Attorney, Agent, or Firm*—Winston Hsu (57) ABSTRACT

A protective apparatus for a portable device is disclosed. The protective apparatus generally includes a main case configured for accommodating the portable device; an accessory case configured for accommodating accessories of the portable device; and a protective jacket including a main jacket and an accessory jacket, wherein the main jacket is configured for receiving the main case, and the accessory jacket is configured for receiving the accessory case; and a strap configured for joining the main jacket and the accessory jacket together. The protective apparatus not only can reduce the damage come from a sudden and violate collision to the portable device, but also provide a whole protection for the portable device without interfering the operation to the portable device.

19 Claims, 10 Drawing Sheets

PROTECTIVE APPARATUS FOR A PORTABLE DEVICE

BACKGROUND

1. Technical Field

The present invention relates to a protective apparatus, particularly to a protective apparatus for a portable device and corresponding accessories.

2. Related Art

As the market trend of portable devices become smaller and tinier, protecting these small, tiny, multi-functioned, sophisticated portable devices has become a subject itself to electronics designers. Generally, not only does current portable devices have a liquid crystal display for displaying images and input keys for entering information, but are also fitted with interfaces for communicating with peripheral equipments, such as earpieces and cords.

Present protective mediums typically consist of a case and a cover for portable devices. When using a portable device with protective medium, the portable devices has to be taken out of the protective medium first before using the portable device. Some protective mediums includes a transparent membrane on an opening excavated in the cover for displaying the information displayed on the LCD (liquid crystal display), but such a configuration undermines a sturdiness of the protective medium.

The U.S. Pat. No. 6,196,405, entitled "Personal organizer case system", issued on Mar. 6, 2001, discloses such a protective case for personal organizers. The case includes a base having a floor and two lower walls extending from the floor, a pair of hinge pins attached to opposing sides of the lower wall, a cover having a accessory cover with an open portion on the accessory cover, and a pair of slots receiving the hinges thereby deciding the protective case in an open or close state. The user has to open the cover to operate the input keys of the portable device accommodating in the protective case.

However the present protective case has three disadvantages, first of all, the protective case lacks a room for placing accessories of the portable device when the accessories are not in use. Second, the protective case lacks a shock-absorbing element. Lastly, the user has to open the cover before operating the portable device.

Accordingly, it would be advantageous if the protective case provides accessories case for placing accessories, a shocking-absorbing element for limiting harsh collisions. And it would be better if the protective case provides the user a genuine touch sense when operating the portable device.

SUMMARY

In view of the foregoing disadvantages inherent in the known protective case now present in the prior art, the present invention provides a protective apparatus make up the shortcomings of present case.

To attain this, the present invention generally includes a main case configured for accommodating the portable device; an accessory case configured for accommodating accessories of the portable device; and a protective jacket including a main jacket, an accessory jacket and a strap, wherein the main jacket is configured for receiving the main case, and the accessory jacket is configured for receiving the accessory case; and a strap configured for joining the main jacket and the accessory jacket together.

A primary object of the present invention is to provide a protective apparatus with a space for accommodating accessories of the portable device.

Another object of the present invention is to provide a protective apparatus to reduce the damage come from a sudden and violate collision to the portable device.

An additional object of the present invention is to provide a protective apparatus can provide a whole protection for the portable device accommodated therein without interfering the operation to the portable device.

DETAILED DESCRIPTION OF THE EMBODIMENTS

Figure 1:
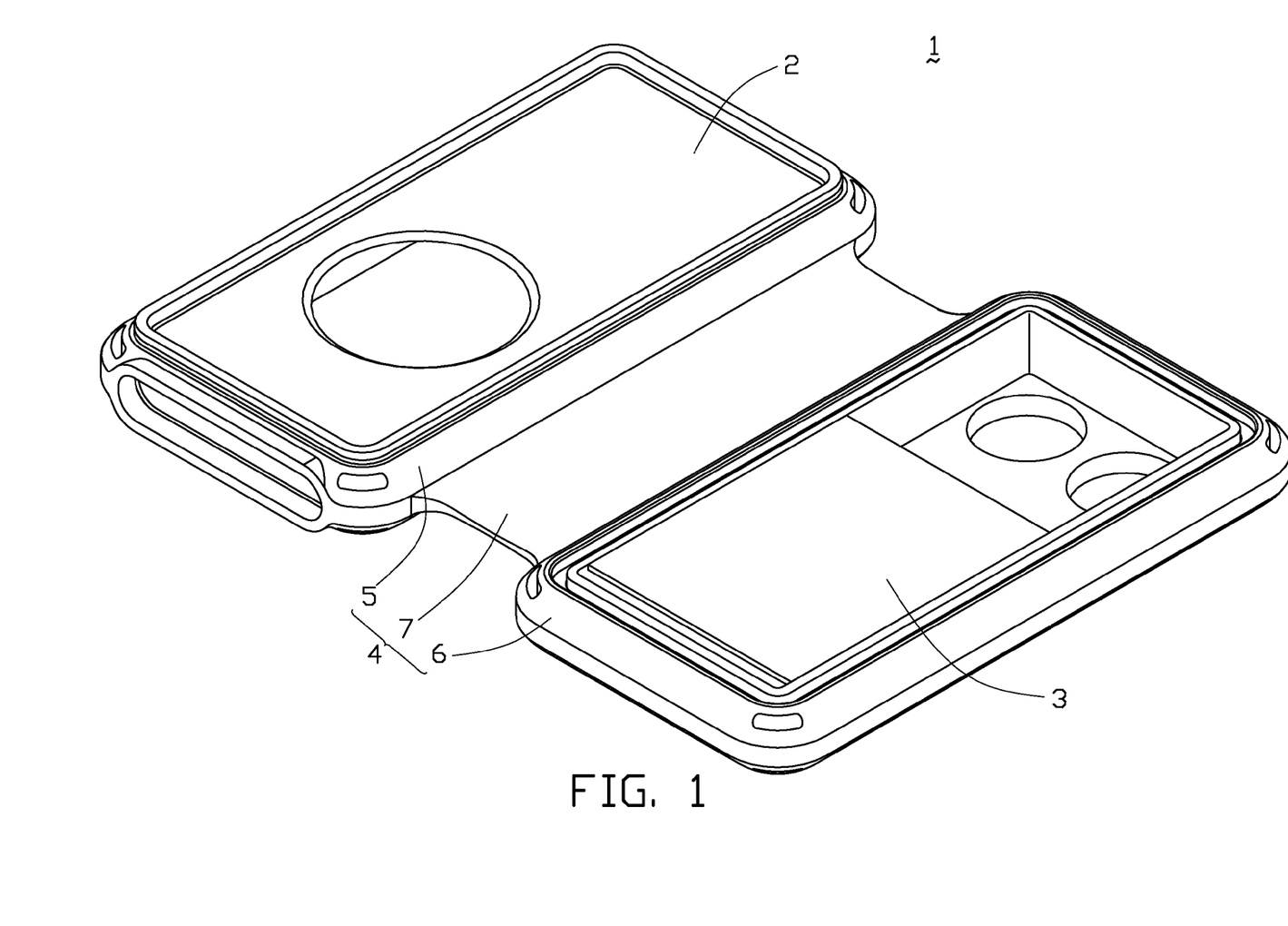
FIG. 1 is a solid view of a protective apparatus in accordance with a first preferred embodiment of the present invention, the protective apparatus being in an opened state and including a main case and an accessory case.

FIG. 1 is a solid view of a protective apparatus in accordance with a first preferred embodiment of the present invention in an open state. The protective apparatus 1 includes a sturdy main case 2, a sturdy accessory case 3, and an elastic protective jacket 4. The main case 2 is configured for accommodating a portable device, and the accessory case 3 is configured for accommodating accessories of the portable device, such as an earphone cord, peripheral extension cables, and/or earplugs. The protective jacket 4 includes a main jacket 5 and an accessory jacket 6 and a strap configured for joining the main jacket 5 and the accessory jacket 6 together. The main jacket 5 and the accessory jacket 6 are structured for accommodating the main case 2 and the accessory case 3 respectively.

Figure 2:
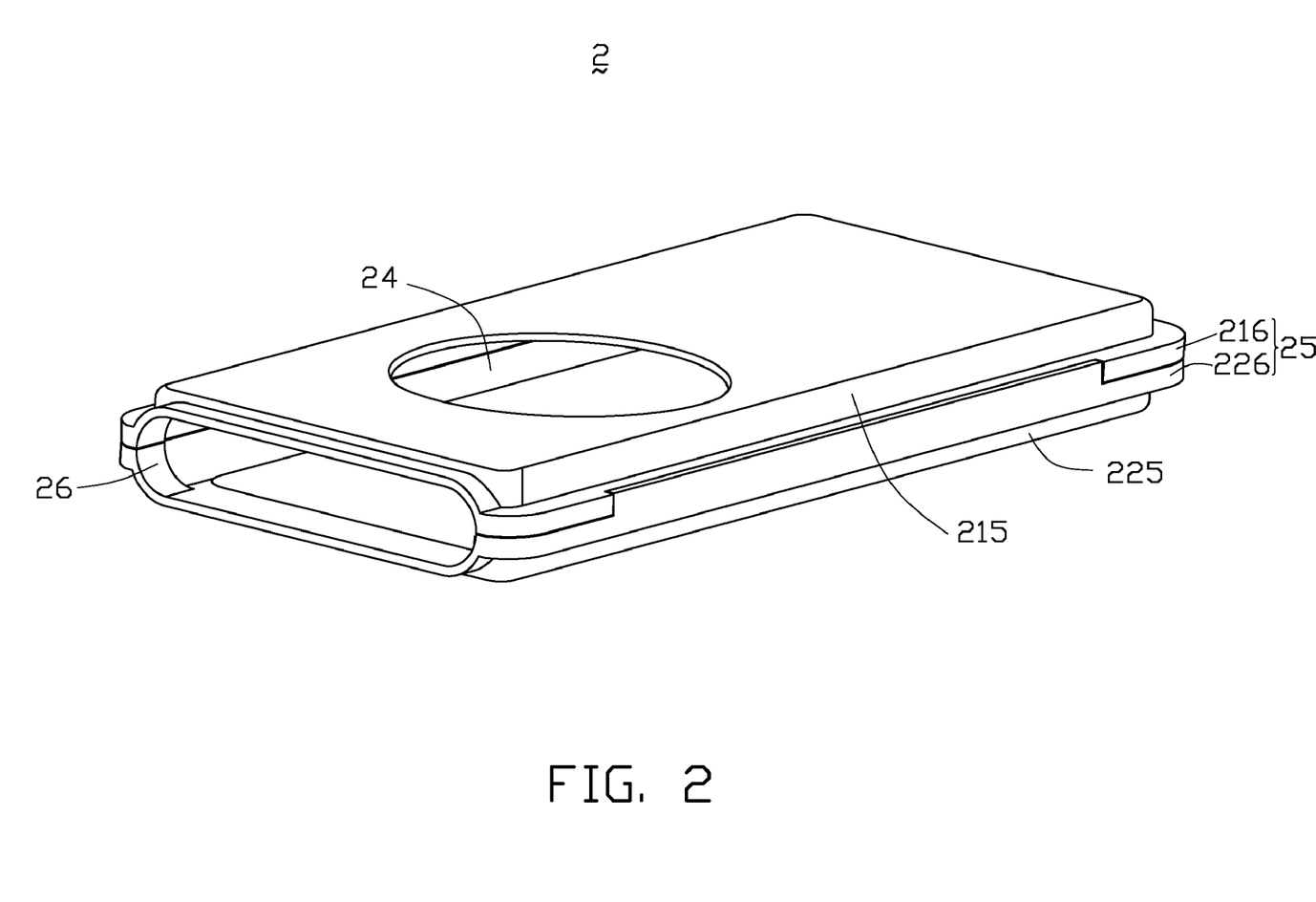
FIG. 2 is a perspective view of the main case of FIG. 1 in a close state.
Figure 3:
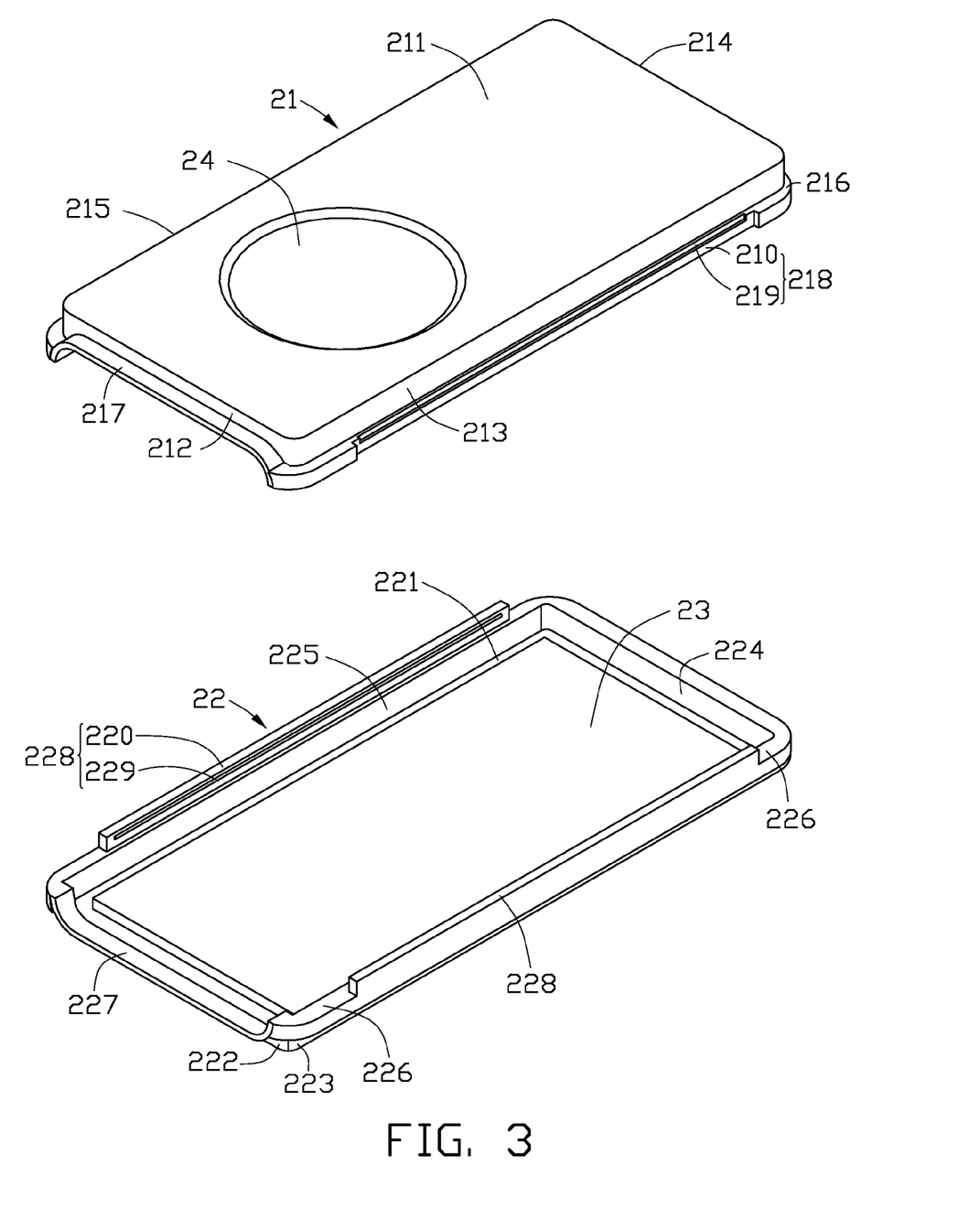
FIG. 3 is a perspective view of the main case of FIG. 1 in an explode state.
Figure 4:
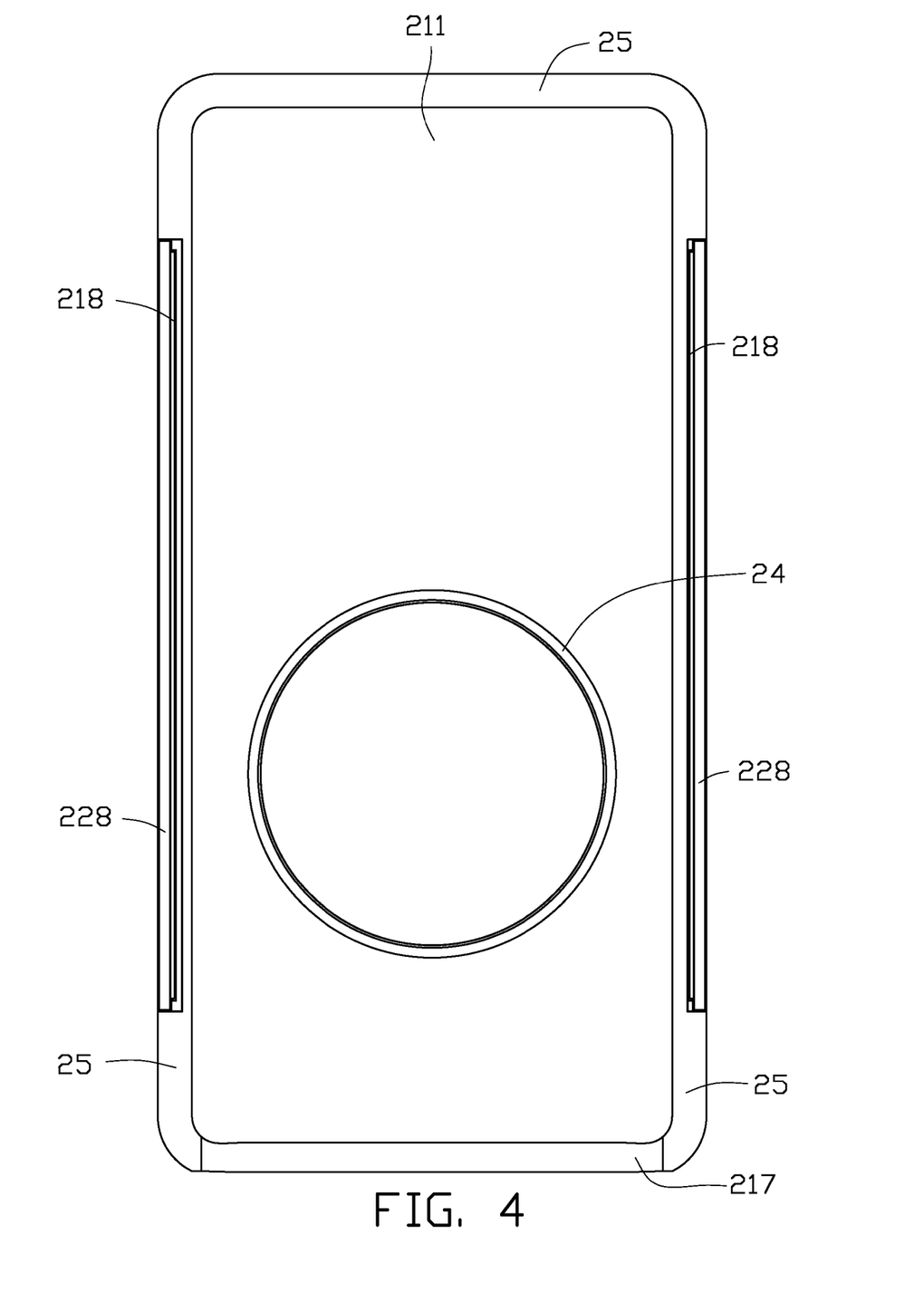
FIG. 4 is a top view of the main case of FIG. 1.
Figure 5:
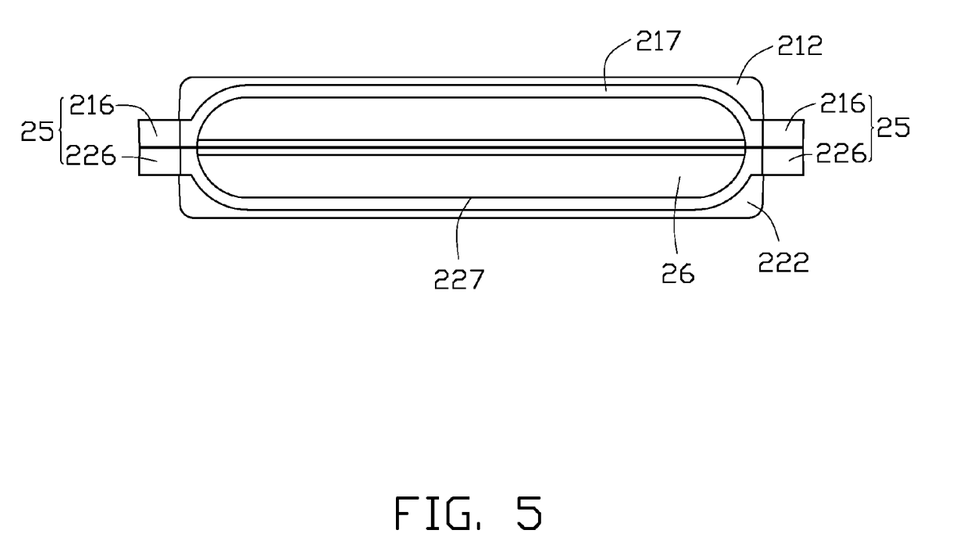
FIG. 5 is a front view of the main case of FIG. 1.

FIG. 2 and FIG. 3 are perspective views of the main case 2 in a closed state and an exploded view respectively. FIG. 4 and FIG. 5 are a top view and a front view of the main case 2 respectively. The main case 2 includes a cover 21 and a holder 22 which secures each other tightly to form a vessel for accommodating various portable devices. In the first preferred embodiment, the main case 2 is designed for accommodating a portable device that is in a predetermined structure. The main case 2 is made of a sturdy, scratch resistant material so as to limit damage from any collisions the main case 2 sustains.

Referring to the cover 21, at least an area of a top panel 211 of the main case 2 is constructed with transparent materials, thus, information displayed on the screen of the portable device can be viewed through the transparent area.

In addition, the main case 2 defines one or more cover openings according to a shape and a position of the operational keys of the portable device when accommodated in the main case 2, thus, allowing the operational keys to be accessible through the cover openings when the portable device is accommodated in the main case 2. For example, in the first embodiment as shown in FIG. 2 and FIG. 3, the main case 2 defines a cover opening 24 in a circular form towards an end of the top panel 211 so as to allow the operational keys to be directly accessible.

Referring to the holder 22 in FIG. 3, a soft pad 23 is disposed on a base panel of the holder 22. The pad 23 is made of flexible material to dampen any impacts between the portable device and the main case 2. The pad 23 further constricts the portable device within the main case 2.

The main case 2 (as shown in FIG. 2) defines a peripheral opening 26 in one of panels of the main case 2 as an interfaces for the portable device. The peripheral opening 26, allows the accessories of the portable device to connect to the interfaces of the portable device without removing the portable device out of the main case 2. In the first preferred embodiment, a half-circular top opening defined on a front panel 212 of the cover 21 is aligned with a bottom half-circular bottom opening defined on a front panel 222 of the holder 22, thereby collaboratively forming the peripheral opening 26 that is an oval form when the case 2 is in a closed state. A half-circular top rim 217 and a half-circular bottom rim 227 extend out along an edge of the half-circular top opening and the half-circular bottom opening respectively.

The main case 2 further includes a flange 25 (as shown in FIG. 2) formed along a middle position of the left panel, the rear panel, and the right panel of the main case 2. The flange 25 composes a cover rim 216 of the cover 21 and a holder rim 226 of the holder 22 (as shown in FIG. 3). The cover rim 216 extends along from an outer edge of the three panels (namely the right panel 213, the rear panel 214, and the left panel 215) of the cover 21; furthermore, ends of the cover rim 216 connect to ends of the rim 217 correspondingly. The holder rim 226 extends from the edge of the three panels (namely a right panel 223, a rear panel 224, and a left panel 225) of the holder 22 and ends of the holder rim 226 connect to ends of the rim 227 correspondingly. Furthermore, when a state of the case 2 is in the closed state, a bottom surface of the rim 216 is aligned and in contact with an upper surface of the rim 217.

The cover 21 and the holder 22 are fastened together with at least a latch. The latch may adopt any latching structures as long as a position of the cover 21 and the holder 22 are secured together. In the preferred embodiment the latch consists of two striking members 228 and two keeper members 218. The keeper members 218 are defined on opposite sides of the cover 21 (i.e., the right surface and the left surface) correspondingly. Each of The keeper members 218 defines a recess 210 on the cover rim 216 further defining a groove 219. The striking members 228 are disposed on opposite sides of the holder 22 (i.e., the right surface and the left surface) correspondingly. Each of the striking members 228 defines an extension 220 on the holder rim 226 further defining a bolt 229 correspondingly. The extension 220 extends from a top surface of the holder rim 226 corresponding to the recess 210 of the keeper member 218, and the bolts 229 protrudes out of the extensions 220 corresponding with the groove 219 of the cover rim 216.

Figure 6:
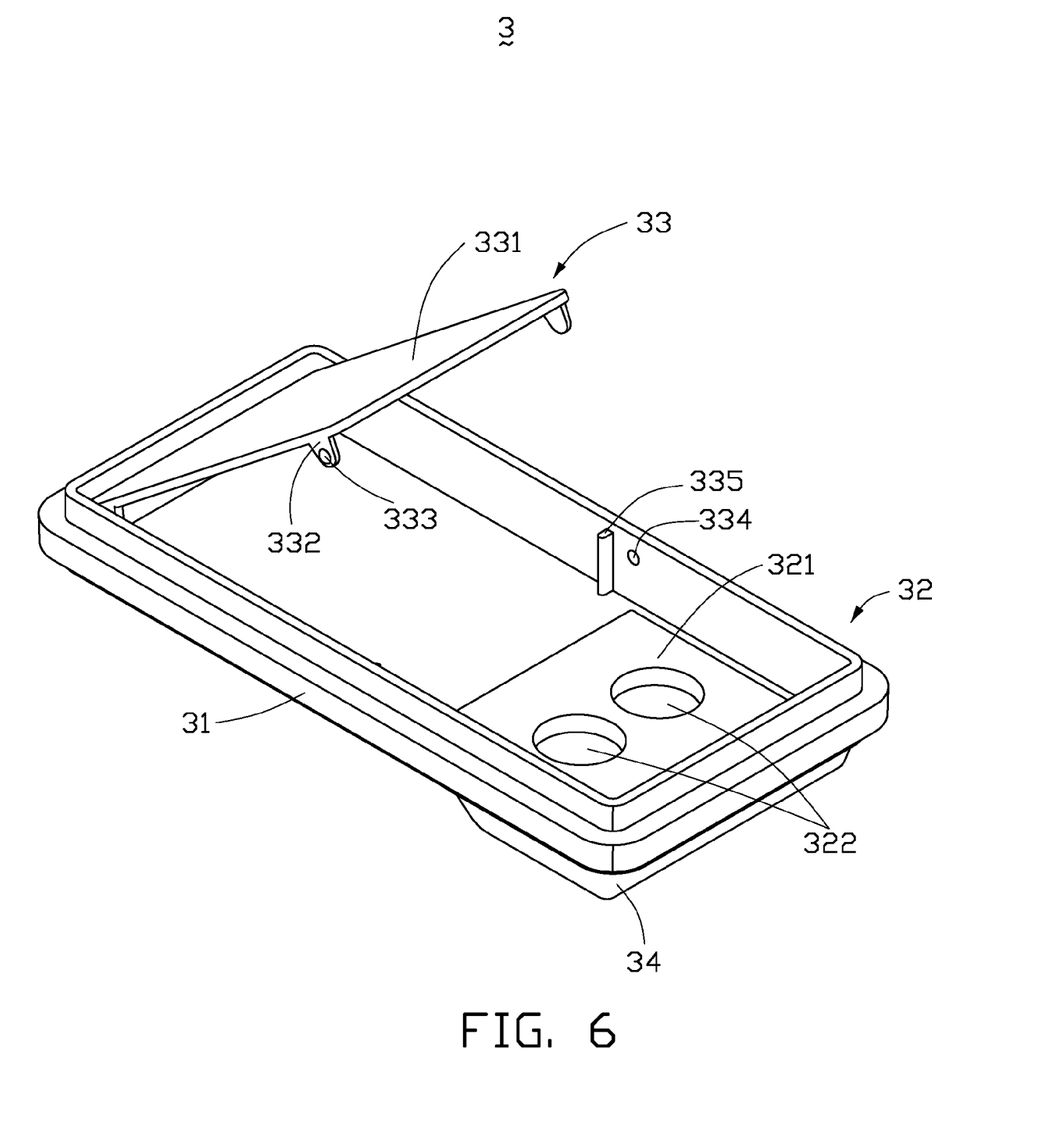
FIG. 6 is a perspective view of the accessory case of FIG. 1 in an opened state.
Figure 7:
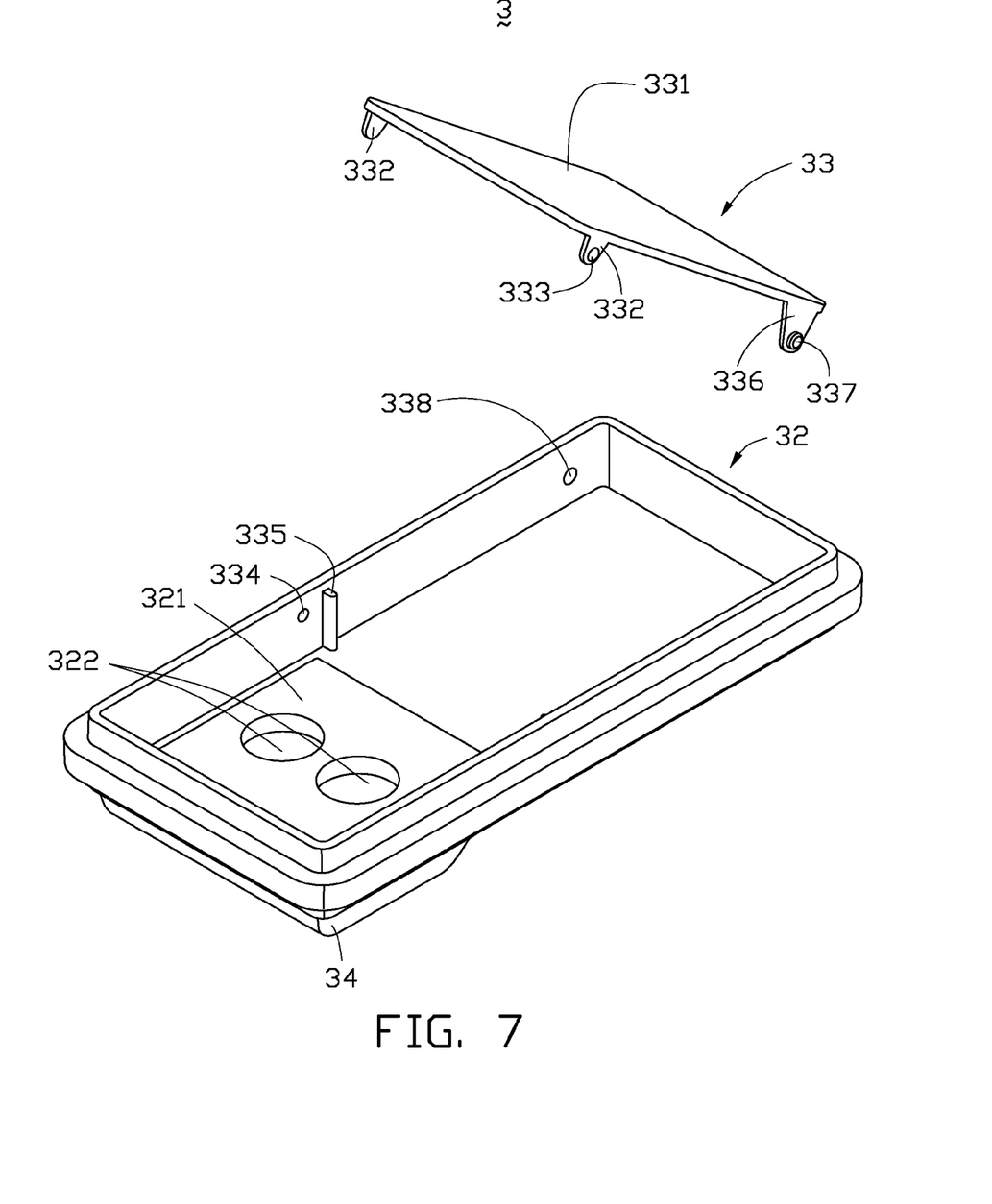
FIG. 7 is a perspective view of the accessory case of FIG. 1 in an explode state.

FIG. 6 and FIG. 7 illustrate the accessory case 3 in an opened and an explode state respectively according to the first embodiment of the present invention. There is a protruding flange 31 around the middle exterior panels of the accessory case 3. The accessory case 3 includes a receptacle 32 and an accessory cover 33 pivotably attached on the receptacle 32. The receptacle 32 is configured for placing the accessories, such as the earphone cord and earplugs, and the accessory cover 33 is configured for concealing the cord placed in the receptacle 32.

From the top view of the accessory case 3, the receptacle defines a recess 34 at an end of a bottom of the receptacle 32. In the recess 34, the receptacle 32 includes a rubber cushion 321 that defines a pair of excavated earplug-holes 322 structured for housing the earplugs. The receptacle 32 defines a pair of swivel slots 338 near the front of the receptacle 32 and a pair of snap slots 334 excavated in the inner wall. The receptacle 32 further includes a pair of support-poles 335 protruding the bottom of the receptacle 32 near the snap slots 334 positioned between the 338 and the 335.

The accessory cover 33 includes a panel 331, a pair of upper-brackets 332, and a pair of lower-brackets 336. The upper-brackets 332 and the lower-brackets 336 extend from the sides of the accessory cover 33 corresponding to the position of the pair of swivel slots 338 and the pair of snap slots 334. The accessory cover 33 further includes a pair of swivels 337 protruding from the surfaces of the lower-brackets 336 and a pair of protrusions 333 protruding from the surfaces of the upper-brackets 332 corresponding to the position of the pair of swivel slots 338 and the pair of snap slots 334.

By inserting the swivels 337 into the swivel slot 338, a front side of the accessory cover 32 is pivotably attached onto the receptacle 32. An upper side of the accessory cover 33 is fastened on the receptacle 32 by snapping the protrusions 333 to the snap slots 334 or is loosened from the receptacle 32 by detaching the protrusions 333 from the snap slots 334. The two support-poles 335 serve as a supporter to prevent the accessory cover 33 from descending.

Figure 8:
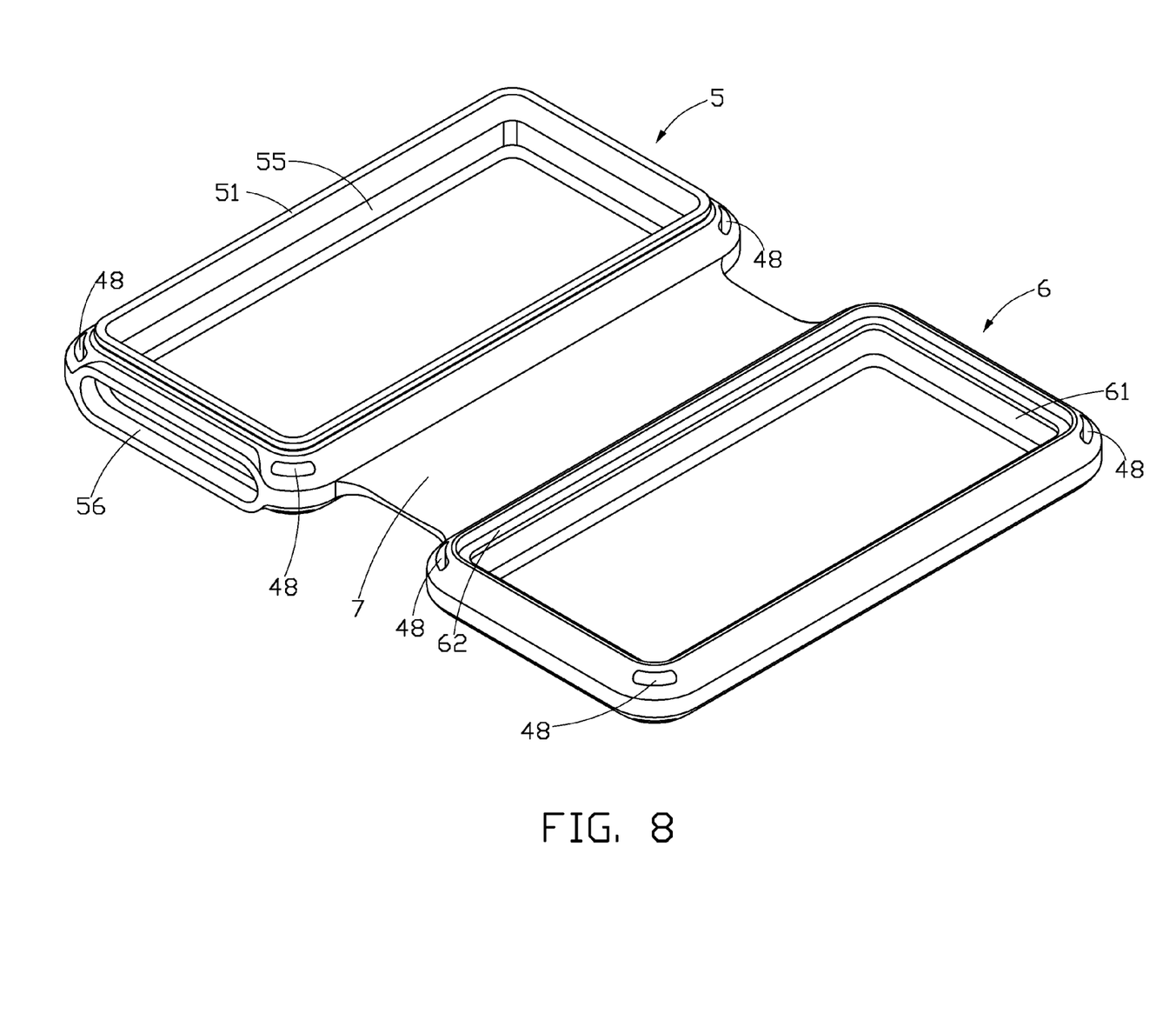
FIG. 8 is a perspective view of a protective jacket of FIG. 1 in an opened state.
Figure 9:
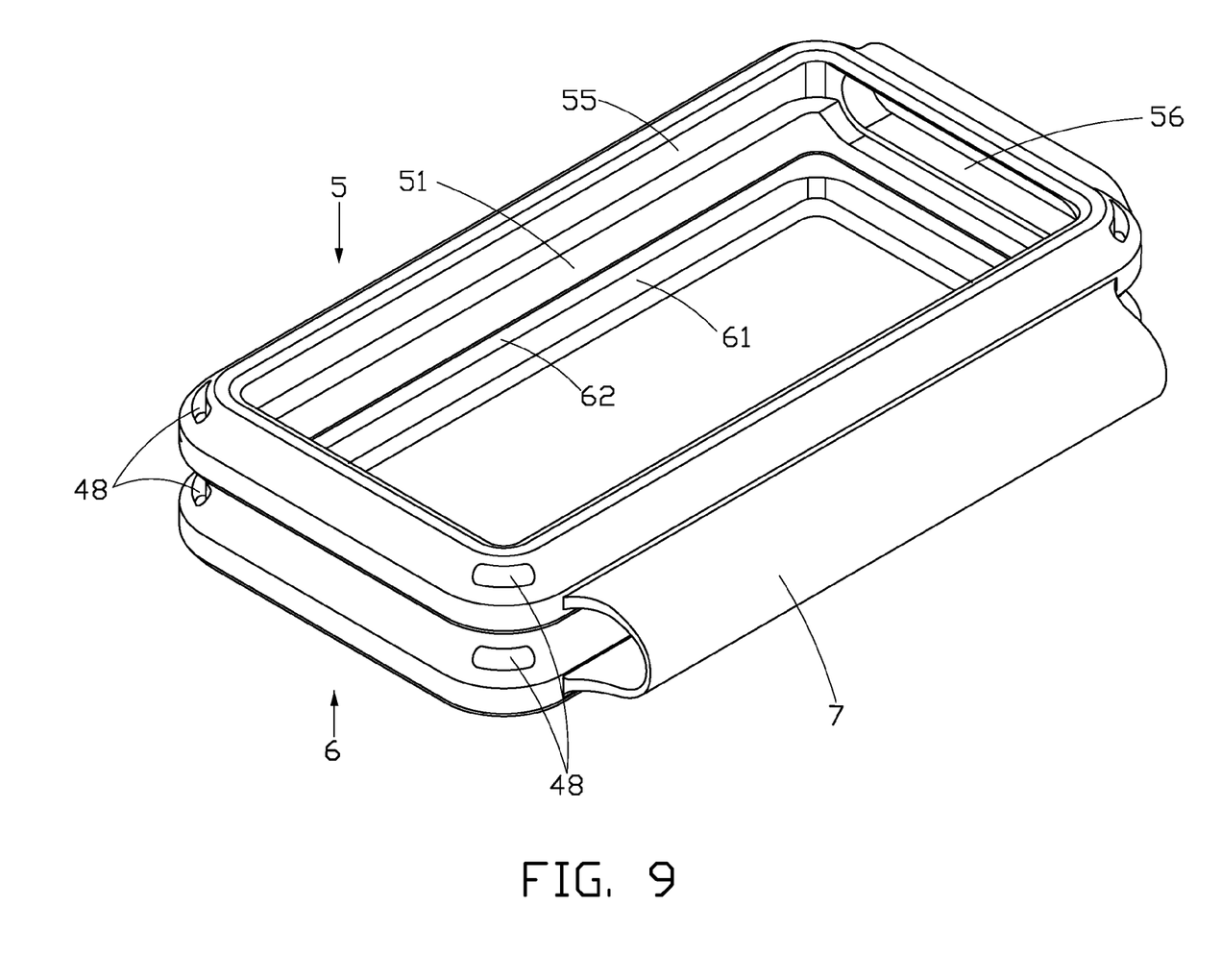
FIG. 9 is a perspective view of the protective jacket of FIG. 1 in a closed state.

FIG. 8 and FIG. 9 illustrate the protective jacket 4 of FIG. 1 in an open state and a close state. The protective jacket 4 composes of wear-resisting materials. The protective jacket 4 includes a main jacket 5, an accessory jacket 6, and a strap 7. In the first preferred embodiment, the strap 7 joins the main jacket 5 and the accessory jacket 6 together. At the corner of the main jacket 4 and the corner of the accessory jacket 6, the protective jacket 4 has several holes 48. The holes 48 further strengthen the shock-absorbing properties of the protective apparatus.

On the front surface of the main jacket 5, the main jacket 5 defines an peripheral opening 56 corresponding to a size and a shape of peripheral opening 26 of the main case 2. The main jacket 5 further defines a groove 55 excavated in an interior wall to be inserted with the flange 25 of the main case 2 correspondingly. The accessory jacket 6 also defines a groove 61 in the interior wall to be inserted with the flange 31 of the accessory case 3 correspondingly.

Referring to FIG. 8, a circumferential ring 51 protrudes on a top surface of the main jacket 5 and a circumferential recess 62 is defined on an inner surface of the accessory jacket 6. When the ring 51 and the recess 62 are joggled together, the protective jacket 4 forms a closed device such as that shown in FIG. 9.

The following steps illustrate how to assemble the protective apparatus 1 accommodating the portable device in. Firstly, insert the portable device into the holder 22 and then close the cover 21. Secondly, sleeve the main jacket 5 onto the main case 2 and the accessory jacket 6 onto the accessory case 4. Thirdly, connect an extension cable of the earphone to an earphone interface of the interfaces of the portable device through the peripheral opening 56 of the main jacket 5 and the peripheral opening 26 of the main case 2. After the portable device is accommodated in the protective apparatus 1, the portable device is controllable by operating the operation keys exposed by the cover opening 24 on the top panel 211. The information displayed by the portable device is viewable via the transparent area of the main case 2. Sound outputted by the portable device can be listened to by using an earphone.

The following steps illustrate how to deposit the accessories in the accessory case 3. Firstly loosen the protrusions 333 from the snap slots 334 and flip open the accessory cover; secondly, place the earphone cord into the receptacle 32; thirdly, close the accessory cover 33 to the accessory case 3; fourthly, place the earplugs into the earplug-holes 322; lastly, close the accessory case 3 and the main case 2.

Figure 10:
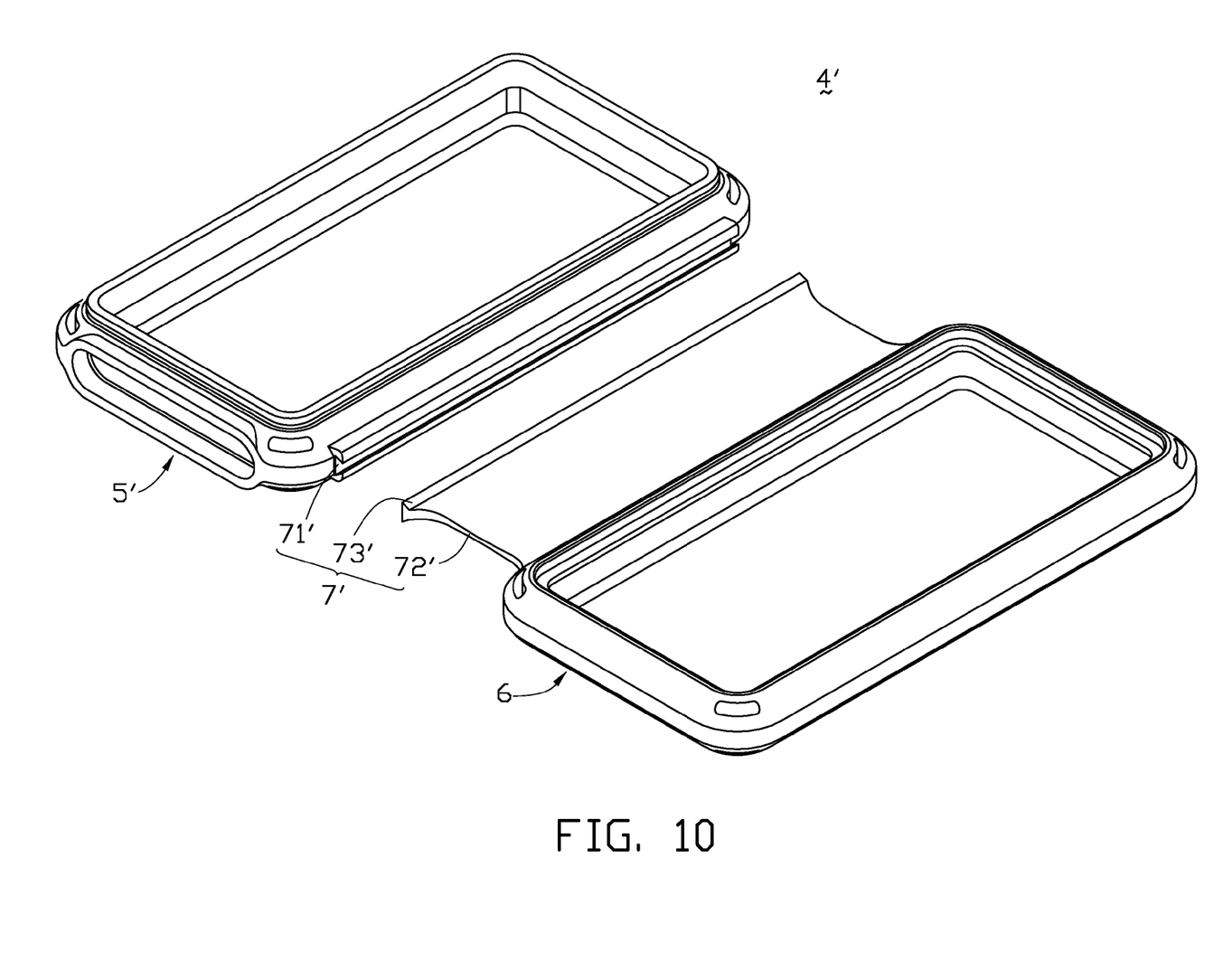
FIG. 10 is a solid view of a protective jacket in accordance with a second preferred embodiment of the present invention in an open state.

FIG. 10 is a solid view of a second preferred embodiment of protective jacket 4' in an opened state. The protective jacket 4' includes a main jacket 5', an accessory jacket 6', and a detachable strap 7'. The strap 7 includes a slot 71' and a slice 72'. The slice 72' is configured with a slide bar 73' on the side. The slide bar 73' slides into the slot 71' thereby connecting the main jacket 5' and the accessory jacket 6'.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A protective apparatus for a portable device, comprising:
    a main case configured for accommodating the portable device, the main case comprising a cover and a holder fastened together with a latch, the latch securing the holder tightly to form a vessel for accommodating the portable device;
    an accessory case configured for accommodating accessories of the portable device, the accessory case comprising a receptacle and an accessory cover pivotably attached to the receptacle, the accessory case being configured for placing and concealing the accessories of the portable device;
    a protective jacket comprising a main jacket and an accessory jacket, wherein the main jacket is configured for receiving the main case, and the accessory jacket is configured for receiving the accessory case; and
    a strap configured for joining the main jacket and the accessory jacket together.

2. The protective apparatus according to claim 1, wherein the cover defines a rim extending along an outer edge of the cover, and the holder defines a rim extending along an outer edge of the holder; the main case defines a flange formed by the rim of the cover and the rim of the holder.

3. The protective apparatus according to claim 2, wherein at least an area of a top panel of the main case is constructed with transparent material and the information displayed on a screen of the portable device is viewable through the transparent area.

4. The protective apparatus according to claim 3, wherein the main case defines one or more cover openings according to a shape and a position of operational keys of the portable device accommodated in the main case.

5. The protective apparatus according to claim 4, wherein a peripheral opening is defined in one of panels of the main case as an interface for the portable device.

6. The protective apparatus according to claim 5, wherein the main case includes a soft pad disposed on a base panel of the holder.

7. The protective apparatus according to claim 1, wherein the accessory case further comprises a protruding flange around exterior panels of the accessory case.

8. The protective apparatus according to claim 7, wherein the receptacle defines a recess at an end of a bottom of the receptacle.

9. The protective apparatus according to claim 8, wherein the receptacle comprises a rubber cushion with a pair of excavated earplug-holes defined in the recess for housing the earplugs.

10. The protective apparatus according to claim 9, wherein the receptacle defines a pair of swivel slots and a pair of snap slots excavated in the inner wall, and a pair of support-poles protruding the bottom of the receptacle.

11. The protective apparatus according to claim 10, wherein the accessory cover comprises a panel, a pair of upper-brackets extending from the sides of the accessory cover corresponding to the position of the pair of swivel slots and the pair of snap slots.

12. The protective apparatus according to claim 11, wherein the accessory cover further includes a pair of swivels protruding from the surfaces of the lower-brackets and a pair of protrusions protruding from the surfaces of the upper-brackets.

13. The protective apparatus according to claim 12, wherein a front side of the accessory cover is pivotably attached onto the receptacle and an upper side of the accessory cover is fastened on the receptacle by snapping the protrusions to the snap slots or be loosen from the receptacle by detaching the protrusions from the snap slots.

14. The protective apparatus according to claim 1, wherein the protective jacket composes of wear-resisting material.

15. The protective apparatus according to claim 5, wherein the main jacket includes a peripheral opening corresponding to the size and the shape of the peripheral opening of the main case.

16. The protective apparatus according to claim 15, wherein the protective jacket comprises a groove defined in an interior wall of the main jacket to be inserted with the flange of the main case.

17. The protective apparatus according to claim 16, wherein the main jacket defines a ring protruding on a top surface of the main jacket, and the accessory jacket defines a recess on an inner surface of the accessory jacket, the ring and the recess are joggle together to close the protective jacket.

18. The protective apparatus according to claim 1, wherein the strap includes a slot and a slice, the slice is configured with a slide bar on one side, the slide bar slides into the slot thereby connecting the main jacket and the accessory jacket.

19. The protective apparatus according to claim 7, wherein the protective jacket comprises a groove defined in an interior wall of the accessory jacket to be inserted with the flange of the accessory case.

* * * * *